(12) United States Patent
Hurwitz

(10) Patent No.: US 7,219,626 B2
(45) Date of Patent: *May 22, 2007

(54) PET TOY HAVING OMNIDIRECTIONAL REFLECTIVITY

(75) Inventor: Marni Markell Hurwitz, Far Hills, NJ (US)

(73) Assignee: Nite Glow Industries, Inc., Far Hills, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/371,847

(22) Filed: Mar. 9, 2006

(65) Prior Publication Data

US 2006/0162673 A1   Jul. 27, 2006

Related U.S. Application Data

(63) Continuation-in-part of application No. 11/185,059, filed on Jul. 20, 2005, which is a continuation-in-part of application No. 11/067,442, filed on Feb. 25, 2005, now Pat. No. 6,978,738, which is a continuation-in-part of application No. 10/935,687, filed on Sep. 8, 2004, now Pat. No. 6,925,965.

(60) Provisional application No. 60/591,936, filed on Jul. 28, 2004.

(51) Int. Cl.
*A01K 29/00* (2006.01)

(52) U.S. Cl. ..................................... 119/707

(58) Field of Classification Search ............... 119/712, 119/769, 792, 793, 795, 797, 798, 702, 707, 119/708, 709, 710, 711

See application file for complete search history.

(56) References Cited

U.S. PATENT DOCUMENTS

| 3,176,584 | A | 4/1965 | De vries | 359/539 |
| 3,190,178 | A | 6/1965 | McKenzie | 359/514 |
| 3,871,336 | A | 3/1975 | Bergman | 119/106 |
| 3,999,521 | A | 12/1976 | Puiello | 359/518 |
| 4,025,159 | A | 5/1977 | McGrath | 359/514 |
| 4,167,156 | A | 9/1979 | Kupperman et al. | 119/795 |

(Continued)

FOREIGN PATENT DOCUMENTS

| JP | 408023814 A | * | 1/1996 |
| JP | 410108576 A | * | 4/1998 |
| JP | 2003307605 A | * | 10/2003 |

*Primary Examiner*—Son T. Nguyen
(74) *Attorney, Agent, or Firm*—Ernest D. Buff & Associates, LLC; Ernest D. Buff; Margaret A. LaCroix

(57) ABSTRACT

A flexible abrasion resistant omnidirectionally reflective pet toy reflects incoming light beam back in the same direction as it was emanated, thereby indicating the location of a pet toy and thereby preventing tripping hazards in pet play areas during dusk or nighttime hours. The pet toy is created by surrounding a central braided rope of nylon or polyethylene fibers with a cylindrically braided reflective sleeve that is coated with an abrasion resistant transparent polymeric coating. The braided reflective sleeve is composed of braided narrow width reflective strips. The flexible retroreflective sheet is formed by thermally bonding corner cube, microsphere retroreflectors, or wide-angle exposed retroreflective lenses to a flexible polymeric sheet. The pet toy reflective braid may include knots and/or play balls or photoluminescence, glow-in-the-dark elements to provide an added measure of safety and enhanced play appeal.

24 Claims, 4 Drawing Sheets

U.S. PATENT DOCUMENTS

| | | | |
|---|---|---|---|
| 4,384,548 A | 5/1983 | Cohn | 359/518 |
| 4,407,233 A | 10/1983 | Bozzacco | 359/518 |
| 4,576,850 A | 3/1986 | Martens | 428/156 |
| 4,582,885 A | 4/1986 | Barber | 528/28 |
| 4,668,558 A | 5/1987 | Barber | 428/156 |
| 4,763,985 A | 8/1988 | Bingham | 359/518 |
| 4,815,818 A | 3/1989 | Thomas | 359/546 |
| 4,950,525 A | 8/1990 | Bailey | 428/164 |
| 4,957,335 A | 9/1990 | Kuney | 359/541 |
| 5,066,098 A | 11/1991 | Kult et al. | 359/540 |
| 5,117,304 A | 5/1992 | Huang et al. | 359/529 |
| 5,200,262 A | 4/1993 | Li | 442/379 |
| 5,237,448 A | 8/1993 | Spencer et al. | 119/792 |
| 5,243,457 A | 9/1993 | Spencer | 119/795 |
| 5,283,101 A | 2/1994 | Li | 428/141 |
| 5,777,790 A | 7/1998 | Nakajima | 359/536 |
| 5,882,796 A | 3/1999 | Wilson et al. | 428/411.1 |
| 5,910,858 A | 6/1999 | Frey et al. | 359/534 |
| 5,926,314 A | 7/1999 | Smith et al. | 359/530 |
| 5,961,406 A * | 10/1999 | Hass | 473/576 |
| 5,962,108 A | 10/1999 | Nestegard et al. | 428/172 |
| 6,070,556 A | 6/2000 | Edwards | 119/792 |
| 6,159,537 A | 12/2000 | Crandall | 427/163.4 |
| 6,677,028 B1 | 1/2004 | Lasch et al. | 428/161 |

* cited by examiner

PET TOY HAVING OMNIDIRECTIONAL REFLECTIVITY

CROSS-REFERENCE TO RELATED APPLICATIONS

This application is a continuation-in-part of U.S. application Ser. No. 11/185,059 Jul. 20, 2005 which, in turn, is a continuation-in-part of U.S. application Ser. No. 11/067,442, filed Feb. 25, 2005 now U.S. Pat. No. 6,978,738 which, in turn is a continuation-in-part of U.S. application Ser. No. 10/935,687, filed Sep. 8, 2004 now U.S. Pat. No. 6,925,965 which, in turn, claims the benefit of Application No. 60/591,936, filed Jul. 28, 2004.

BACKGROUND OF THE INVENTION

1. Field of the Invention

The present invention relates to pet toys; and more particularly, to a pet toy that is omnidirectionally reflective and has photoluminescence character especially suited for use during dusk or nighttime hours to enhance play appeal for pets and their owners, and increase safety of pet owners that are walking or playing with their pets in pet play areas such as front yards, back yards, and the like.

2. Description of the Prior Art

Walking in a pet play area during dusk or nighttime hours can be hazardous owing to the increased risk of tripping on pet toys scattered around the play area. An illuminating source such as a lamp provides limited visibility and many pet toys are not easily recognized, especially when randomly distributed in grassy areas and the like.

Several approaches devised by prior art workers attempt to provide solutions for this hazardous commonplace activity. These approaches include 1) use of pet collars that are illuminated or reflective; 2) use of leashes which are illuminated or reflective; or 3) a combination of both features. None of these solutions suggest indicating the whereabouts of a pet toy via omnidirectional reflection and/or photoluminescence.

Various types of dog collars illuminated by reflection are known in the art. Representative dog collars of this variety are discussed below.

U.S. Pat. No. 3,871,336 to Bergman discloses a reflective dog collar that is not illuminated; but which utilizes a highly reflective material having the form of different color dots encapsulated in plastic. This illuminates only portions of the flat planar pet collar.

U.S. Pat. No. 3,999,521 to Puiello discloses a reflective safety harness for quadruped animals. The harness includes a pair of identical sheet elements with a light reflective surface mounted on opposite sides of the animal. At the corners of the sheet are fastened straps, which circumscribe the animal's body at the front and rear of the harness. Extending from the front strap, at the top point thereof, midway between the two elements, is a loop through which the dog's regular collar is passed. The arrangement assures immovable attachment of the harness on the dog's body. The disclosure by the '521 patent of a reflective sheet positioned on both sides of the animal does not suggest a pet toy that reflects incident light.

U.S. Pat. No. 4,167,156 to Kupperman, et al. discloses a reflective animal leather leash. The elongated leather animal leash includes a sewn a transparent polyvinyl chloride strip with a light reflective prism design on one surface. The light reflective prism is bonded by dielectric heat sealing or sonic welding to an opaque polyvinyl chloride strip sewn to the leather strip, resulting in a leash having a light reflective surface. Since the strip has a reflective surface on only one side of the leash, it does not reflect light in every direction. The flat leather leash is not easily twistable and is not readily bent without separating the transparent and opaque polyvinyl chloride layers. This concept is not applicable to a pet toy that has to withstand significant bending and twisting.

U.S. Pat. No. 4,384,548 to Cohn discloses a safety device for animals. A pet collar uses "retro-reflective" threads with glass reflective elements in a flexible webbing to form a pet leash. The threads are said to reflect incident light directly back toward the source. Disposition of reflective threads in the webbing forming the collar is sparce. As a result, the quantum of incident light reflected is small; and an insignificant quantum of incident light is reflected back to the source. The '548 patent does not disclose a pet toy.

U.S. Pat. No. 4,407,233 to Bozzaco discloses a safety collar for pets. The collar has highly reflective flexible elements with a length large enough to extend beyond the outer surface of the pet's hair. It uses flexible elements with Scotchlite reflecting strips attached to a collar. A reflective pet toy is not disclosed, and the flexible elements do not reflect light in every direction.

U.S. Pat. No. 5,243,457 to Spencer discloses a material with enhanced visibility characteristics. This flexible visibility enhancing material combines the advantages of a light reflective component and a luminescent component. The material includes a first layer of prismatic light reflective plastic material having an underlying surface formed with a plurality of minute prism-like formations projecting there from at regular spaced intervals, and an overlying substantially smooth light transmissive surface. Bonded, i.e. by heat-sealing, to the first layer is a second layer of plastic luminescent material. The second layer is contiguously and integrally attached to the underlying surface of the prism-like formations and generally coextensive therewith. The visibility enhancing material simultaneously radiates luminescent light from the second layer through the underlying surface of prism-like formations and through the smooth light transmissive surface and reflects light from the prism-like formations through the smooth light transmissive surface. In one embodiment, a leash for controlling and restraining a pet animal includes a flexible elongate member comprised of the visibility enhanced material. In another embodiment, the second layer is replaced with a layer of luminescent material, which can be selectively energized to become luminous. Since the transparent reflective material is a molded plastic of prismatic construction it is rigid and is not flexible and does not form a pet toy that is capable of being twisted and bent. Further any twisting and bending action during pet play separates the reflective element from the luminescent element.

U.S. Pat. No. 5,237,448 to Spencer, et al. discloses a visibility enhancing material. The flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. A second layer of plastic luminescent material is contiguously and integrally attached to the underlying surface of the prism-like formations and generally coextensive therewith. The visibility enhancing material simultaneously radiates luminescent light from the second layer through the underlying surface of the prism-like formations and through the smooth light transmissive surface, and reflects light from the prism-like formations through the smooth light transmissive surface. In one embodiment, a leash for controlling and restraining a pet animal includes a flexible elongate member comprised of the visibility enhanced material. Since the transparent reflective material is a molded plastic of prismatic construction, it is rigid and is not flexible and does not form a pet toy that is capable of being twisted and bent. Furthermore, any twisting and bending action during pet play will result in separation of the reflective element from the luminescent element.

U.S. Pat. No. 6,070,556 to Edwards discloses an illuminating dog safety system. This illuminating dog safety system is designed for allowing an animal to be more visible at night. The device includes a collar that is worn around a neck of an animal. The collar has a reflective strip extending a majority of its length. A harness is provided that is adapted to be worn around a torso of the animal. The harness is comprised of an upper strap member, a lower strap member, and a longitudinal extension there between. The upper strap member, the lower strap member, and the longitudinal extension each have a reflective strip extending a majority of a length thereof. A leash is provided that is adapted for securement to the collar. The leash has a reflective strip extending a majority of its length. All these strip elements are made from flat elements, as shown in FIG. 3 of the patent disclosure. Twisting the elements such as during pet play of a pet toy does not provide the reflectivity needed for adequate visibility at night.

Numerous patents disclose reflective materials. Some of these patents disclose reflective elements having corner cube shapes embedded in a rigid or flexible polymeric strips and monolayers of spherical beads, i.e. primarily glass beads bonded to a reflective sheet.

U.S. Pat. No. 3,176,584 to DeVries, et al. discloses that a reinforcing layer may be incorporated into an embedded lens retroreflective sheeting. The reinforcing layer may be of a similar composition as the binder in which the microspheres are embedded. The layer may be applied to the back side of the secularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. The reflective layer is typically very thin and fragile, i.e. in the order of 0.06 microns thick, and must be disposed in special relationship to the microspheres in order for the sheeting to provide useful retro-reflection.

U.S. Pat. No. 3,190,178 to McKenzie discloses a reflex reflective sheeting. It uses a monolayer of microspheres embedded in a polymer to reflect the incoming light beam in the same direction as the incident beam. Since the sheet is formed by melting of the polymeric binder, it is rigid and therefore unsuitable for flexible pet toys.

U.S. Pat. No. 4,025,159 to McGrath discloses cellular retroreflective sheeting. The cellular retroreflective sheeting comprises a base layer of retroreflective elements and a transparent cover film supported in spaced relation away from the base layer by a network of narrow intersecting bonds. These bonds form hermetically sealed cells within which retroreflective elements are isolated from retroreflective elements of different cells. The resultant sheeting achieves greater durability through use of bonds that are cured in situ after they have been thermoformed into sealing contact between the cover film and base layer. The base material is coated with the binder, subjected to heat and pressure to displace the binder around the embedded microsphers or corner cubes forming the bonded network. Retroreflective articles so constructed may be rigid and inflexible.

U.S. Pat. No. 4,576,850 to Martens, and U.S. Pat. Nos. 4,582,885, 4,668,558 to Barber disclose a shaped plastic articles having replicated microstructure surfaces. This shaped plastic article is made by crosslinked polymer with hard and soft segments having a microstructure-bearing surface that is replicated, with a castable fluid, and radiation hardened. Articles formed by this process exhibit, a retroreflective cube-corner sheeting, Fresnel lens or video disc. All these formed articles are rigid and therefore unsuitable for use in pet leashes. Moreover, these articles also exhibit low tear strength.

U.S. Pat. No. 4,763,985 to Bingham discloses a launderable retroreflective applique that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides.

U.S. Pat. No. 4,815,818 to Thomas discloses three-dimensional flexible reflectors. The reflector is provided with elastomeric resilient member with a plurality of embedded retro-reflective glass beads. A portion of the outer surface of the elastomeric material is removed to expose the glass beads. The exterior surface of the glass beads at the outer surface is exposed and is subject to abrasion.

U.S. Pat. No. 4,950,525 to Bailey discloses elastomeric retroreflective sheeting. The elastomeric retroreflective sheeting has a monolayer of non-stretchable microspheres. These microspheres are embedded in a sheet with a spacing layer of transparent elestomeric material underlying the back surface of the microspheres. A cover layer of transparent elastomeric material covers the front surface of the microspheres. A specularly reflective layer is disposed on the back surface of the spacing layer. The cover layer comprises a clear thermoplastic elastomeric aliphatic polyurethane.

U.S. Pat. No. 4,957,335 to Kuney discloses microsphere-based retro-reflective articles having high retroreflective brightness at narrow divergence or observation angles, i.e. up to 0.5 degrees. The article is made by selection of microspheres having defined combinations of average diameter and average refractive index. This patent teaches (column 4, lines 18–23) that variation in the size of the microspheres will increase the observation angle or divergence angle of the resultant retro-reflective article. This retroreflective article does not have photoluminescence elements.

U.S. Pat. No. 5,066,098 to Kult, et al. discloses cellular encapsulated-lens high whiteness retroreflective sheeting with a flexible cover sheet. This cellular, encapsulated-lens retroreflective sheeting comprises a base sheet of a monolayer of retroreflective elements that is partially embedded in a binder layer which typically is white. A cover sheet is disposed in spaced relation from the layer of retroreflective elements. A network of narrow intersecting bonds, or seal legs, that extend between the cover sheet and the base sheet with binder material are thermoformed at the point of contact between the base sheet and cover sheet. Such a rigid, reflective sheet is unsuitable for pet toys, which require structures that can twist and flex during pet play.

U.S. Pat. No. 5,117,304 to Huang, et al. discloses a retroreflective article. The retroreflective article has corner cubes and is flexible, and can be applied over irregular surfaces by using an optically clear, aliphatic polyurethane polymer. The aliphatic polymer has a plurality of hard chain segments having the formula —C(O)N(H)—$C_6 H_{10}$—N(H)C(O)—.

U.S. Pat. No. 5,200,262 to Li discloses a launderable retroreflective applique. The applique employs a reflector that comprises elemental aluminum or elemental silver on the backside of the microspheres. The applique comprises a monolayer of metal-coated microspheres partially embedded in and partially protruding from a binder layer. The binder layer comprises a flexible polymer having hydrogen functionalities and one or more isocyanate-functional silane coupling agents. The disclosed flexible polymers that possess hydrogen functionalities are crosslinked, flexible urethane-based polymers, such as isocyanate-cured polymers or one or two component polyurethanes and polyols. This retroreflective applique is unsuited for pet toys.

U.S. Pat. No. 5,283,101 to Li discloses a launderable retroreflective applique comprising a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene, such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. When the appliqué is inverted, light comes through the binder layer. This reflective appliqué is not flexible enough to be used in a pet toy.

U.S. Pat. No. 5,777,790 to Nakajima discloses a microsphere-based retroreflective article. The retroreflective article comprises a monolayer of microspheres partially embedded in and protruding from a binder layer and specular reflector underlying the microspheres. The monolayer of microspheres comprises a mixture of a first class of microspheres having a first refractive index and a second class of microspheres having a second refractive index. The second refractive index is higher than the first refractive index. As a result, the sheeting exhibits superior observation angle angularity. This reflective sheeting is unsuited for pet toys.

U.S. Pat. No. 5,882,796 to Wilson, et al. discloses bonded structured retroreflective sheeting. The structured retroreflective sheeting includes an array of corner cube structured retroreflective elements, a thermoplastic sealing film located proximate the structured elements, and bonding agent between the sealing film and the structured retroreflective elements. The bonding agent bonds the sealing film to the structured retroreflective film. This bonded structure is rigid and is unlikely to survive the flexing and twisting movements to which pet toys are subjected.

U.S. Pat. No. 5,926,314 to Smith, et al. discloses a retroreflective cube corner article having scalene base triangles. The cube corner retroreflective article exhibits a wide range of retroreflective entrance angularity in at least one plane, and preferably in two or more planes. The structured surface has an array of cube corner elements formed by three intersecting sets of substantially parallel grooves. Each cube corner element includes a base triangle bonded by one groove from each of the three intersecting groove sets, the base triangle being scalene. The corner cube reflector is rigid and cannot be used for producing reflective pet toys.

U.S. Pat. No. 5,962,108 to Nestegard, et al. discloses a retroreflective polymer coated flexible fabric material and method of manufacture. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA). These polymers are flexible, durable, and resistant to abrasion. The retroreflective prismatic elements layer includes: acrylic polymers, such as poly(methylmethacrylate); polycarbonates; cellulosics; polyesters such as poly(butyleneterephthalate); poly(ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material include: polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Such a reflective fabric does not suggest the shape, construction or function of a pet toy.

U.S. Pat. No. 5,910,858 to Frey discloses retroreflective sheeting with a coated back surface. The retroreflective sheet has a plurality of indentations on the back surface to reflect the light, and a transparent front surface to encapsulate and protect the light reflecting indentations. This reflective sheet is rigid and is unsuitable for use in pet toys.

U.S. Pat. No. 6,159,537 to Crandall discloses a method of making a retroreflective article that has a binder layer containing an epoxy resin and silicone crosslinked polymer. A pre-binder composition comprises about 5 to about 40 parts of an epoxy resin. About 60 to about 95 parts of an alkoxysilane terminated polymer is applied to a retroreflective layer and then cured to form a binder layer that is adhered to the retroreflective layer and an article of clothing. The binder composition does not cover the exterior surface of the reflective layer and does not provide abrasion resistance.

U.S. Pat. No. 6,677,028 to Lasch, et al. discloses retroreflective articles having multilayer films and methods of manufacturing same. These retroreflective articles have multilayer films and are useful for commercial graphics and retroreflective products, such as roll-up signs for highway transportation safety. The articles comprise multilayer films having at least one layer of polyurethane and a core layer of a copolymer of alkylene and a bond layer of non-acidic, polar co-monomer including, ethylene copolymer, vinyl acetate, acrylate, EVA, acid-modified EVA, anhydride-modified EVA, acid-acrylate-modified EVA, anhydride-acrylate-modified EVA, EEA, EMA, AEA, EVACO, EBACO, and EnBA. The glass retroreflective beads comprise an air-exposed portion or have an overlay polyurethane or EAA cover film. When retroreflective glass beads are exposed to air, they are subject to wear.

Notwithstanding the efforts of prior art workers to construct pet toys that are illuminated by incident light, there remains a need in the art for a flexible abrasion resistant pet toy that omnidirectionally reflects a significant quantum of incoming light back to its source. Numerous methods for producing retroreflectors have been disclosed. A flexible pet toy having a robust construction that withstands forces generated during pet play has long been needed in the art. Also needed is a flexible, omnidirectional abrasion resistant pet toy capable of maintaining high reflectivity when subjected to surface abrasion from frictional forces created by contact of the pet toy with objects having rough exteriors, such as the ground, flooring, posts, trees and the like during pet play. Also needed is a pet toy adapted to provide photoluminescence that indicates the presence of the pet toy in a dimly lit environment and prevents tripping hazards.

SUMMARY OF THE INVENTION

The present invention provides an abrasion resistant pet toy that is omnidirectionally reflective and exhibits photoluminescence. The pet toy is made visible with a flash light since the incident light is reflected back to the source by omnidirectional reflectors. Tripping hazards during pet play are reduced. Pet toys are readily located, even when immersed in grassy front and back yard play areas. Due to the presence of the photoluminescence elements, pet toys constructed in accordance with the present invention glow in the dark, and are easy to locate, even in darkened rooms. The photoluminescence effect generated by the pet toy, also provides an interesting play appeal to pets and their owners.

Omnidirectional reflectivity is provided by the incorporation of retroreflective corner cube reflectors or microsphere reflective elements thermally bonded onto a nylon mesh strip to form a flexible nylon retroreflective sheet, which is in turn sewn or bonded onto a narrow width reflective strip. With this structure, the pet toy reflects a significant quantum of the incident light from a flashlight or other light-emitting element back to the source. The abrasion resistance property of the pet toy is provided by a transparent coating over the omnidirectional strips. One such coating comprises a polymer that is transparent, flexible and has a refractive index significantly smaller than that of the retroreflective elements used. Abrasion resistance and omnidirectional reflectivity is achieved by: a) creating a flexible retroreflective sheet comprising a plurality of corner cube reflectors bonded via a transparent bond to a flexible polymeric sheet, or several microspheres bonded via a transparent bond to a reflectorized flexible polymeric sheet; b) producing a narrow width strip composed of nylon or polypropylene fibers by knitting, weaving or braiding, to achieve a strip width in the range of 0.0065 inch to 0.25 inch, depending upon the size of the central cylindrical rope core of the pet toy; c) thermally bonding a flexible retroreflective sheet onto a nylon mesh strip to form a flexible nylon retroreflective sheet which is in turn sewn or bonded onto a show surface of the narrow width strip, thereby forming a narrow width reflective strip; d) cylindrically braiding, at a shallow braid angle, three or more narrow width reflective strips to surround and cover the external surface of a central cylindrical rope core made from braided nylon or polypropylene fibers; e) forming a cylindrical retroreflective braided sleeve integrally surrounding a central cylindrical pet toy core to thereby create a pet toy having an external retroreflector surface; and f) coating the external surface of the cylindrical retroreflective braided sleeve with a transparent, flexible abrasion resistant coating having a refractive index significantly less than that of the retroreflective elements. The thickness of the transparent abrasion resistant coating is in the range of 0.002 to 0.010 inches.

The external surface of the cylindrical retroreflective braided sleeve is coated with a transparent, flexible abrasion resistant polymeric coating. The coating has a refractive index significantly lesser than that of retroreflective elements. Typically the retroreflective elements have a refractive index of 1.9 to 2.2 and the flexible transparent abrasion resistant polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

The cylindrical character of the flexible cylindrical braided sleeve reflects a significant quantum of incident light back to the source effectively since some portion of the braided sleeve is always at angles close to normality and most of the braided cylindrical sleeve falls within the reflecting angular range of the retroreflectors. The shallow braiding angle of the cylindrical braid sleeve lays the sewn or bonded narrow width strips at a shallow angle with respect to the length of the cylindrical central core. As a result the pet toy can be readily flexed or twisted during pet play due to the relative movement provided within the cylindrical braid sleeve structure. The flexibility of the transparent abrasion resistant coating provides for flexing and twisting movement of the abrasion resistant pet toy without coating separation or delamination.

The pet toy comprises a cylindrical reflective braided sleeve having three or more narrow width reflective strips that are braided at a shallow cylindrical braid angle, said cylindrical reflective braided sleeve being operable to surround the central cylindrical braided rope core thereby providing omnidirectional reflectivity. Each narrow width reflective strip has a flexible nylon retroreflective sheet sewn to their show surface. The flexible nylon retroreflective sheet is formed by thermally bonding a retroreflector coated flexible polymer sheet to a nylon mesh strip.

The pet toy may incorporate photoluminescence elements in addition to the rope with omnidirectional reflectors. The photoluminescence elements are generally polymeric articles in the form of tubes, crosses and the like which are molded with photoluminescent compounds. Compounds of this property include zinc sulfur compositions, calcium sulfur compositions and oxide compositions incorporating rare earth dopants. The photoluminescent compound when exposed to light is excited and emits light at a lower wavelength (lesser energy level) over a period of time after the exciting light source has been removed. Many of the photoluminacent compounds glow in the dark for several hours. The pet toy incorporates photoluminescence elements either as a cross member or as decorative elements. Pet toys, which provide photoluminescence illumination provides the pet an enhanced appeal due to the different spectral sensitivity of pet's eyes.

The photoluminescence element of the pet toy includes a molded polymeric body in the form of tubes, crosses and the like that incorporates photoluminescence compounds. Compounds of this property include zinc sulfur compositions, calcium sulfur compositions and oxide compositions incorporating rare earth dopants. The photoluminescent compound when exposed to light is excited and emits light at a lower wavelength (lesser energy level) over a period of time after the exciting light source has been removed. Each photoluminescent compound has a characteristic decay time period of photoluminescence. Many of the photoluminescence compounds glow in the dark for several hours. The pet toy incorporates photoluminescence elements either as a cross member or as decorative elements. Pet toys, which provide photoluminescence illumination provides an enhanced play appeal for the pet owing to the uniquely different spectral sensitivity of the pet's eyes.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
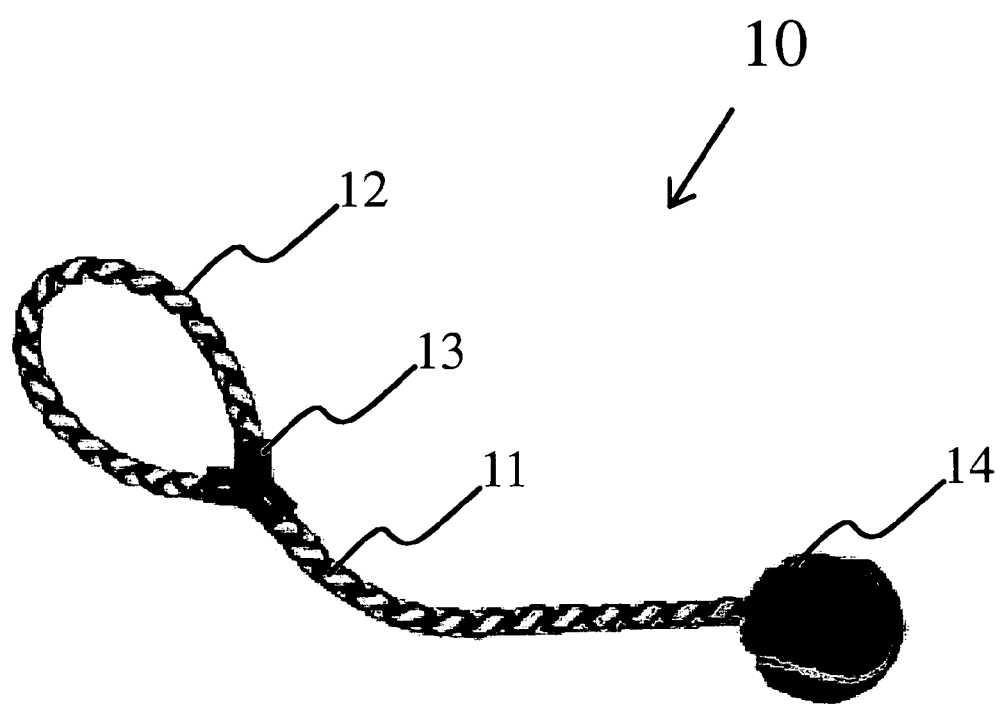
FIG. 1 is a photograph of the pet toy with the reflective cylindrical braided sleeve of narrow width strips covering a central core rope forming a pet toy that has a loop, a photoluminescence element and a play ball attached to the rope with an omnidirectionally reflective sleeve.

The present invention provides an abrasion resistant pet toy that is flexible, twistable and omnidirectionally reflective with optional photoluminescence elements. The pet toy may be constructed in several geometrical forms incorporating one or more play balls and/or one or more photoluminescence polymeric elements, which may be functional or purely decorative. Since the pet toy is omnidirectionally reflecting, it can be located by flashlight in a darkened environment since the light from the flashlight is reflected back. Since the pet toy reflects light over a broad range, due to its reflective cylindrical sleeve arrangement, the flashlight can be at a significant angle and could still be reflected back. This prevents tripping hazards while walking in a pet play area and enables easy location of pet toys. The pet toy may optionally contain photoluminescence elements, which are photoluminescence compounds molded in a polymeric object. When exposed to sunlight or room light these photoluminescence compounds are excited and emit light at a longer wavelength for a long period of time, for example several hours. These molded polymeric articles with photoluminescence compound therefore glow in the dark after the incident light is removed. They aid the process of locating the pet toy and prevent injuries to pet owners caused by tripping, ankle turns, cuts and the like. The light emitted by the pet toy that incorporates a photoluminescent quality has elements of attraction for the pet.

The abrasion resistant omnidirectional pet toy is constructed by building a cylindrically reflective sleeve from narrow width strips of nylon or polypropylene. Reflectivity is achieved by first selecting a flexible polymer sheet and coating the flexible polymer sheet with a plurality of retroreflectors using a transparent binder to form a retroreflector coated flexible polymer sheet. The retroreflector coated flexible polymer sheet is then thermally bonded to a nylon mesh strip to form a flexible nylon retroreflective sheet. The flexible nylon retroreflective sheet is then sewn or bonded onto a show surface of a narrow width reflective strip. At least three of these narrow width reflective strips are braided at a shallow cylindrical braid angle to form an omnidirectionally reflective sleeve having a braided construction.

The retroreflecting elements may be corner cubes, in which case the polymeric flexible sheet can be non-reflective. Alternatively, the retroreflecting elements may be microspheres. If microspheres are used as retroreflective elements, the polymeric flexible sheet needs to be reflective and is typically metallized with aluminum or silver. In either case, the retroreflective elements are bonded to the flexible sheet using a transparent binder.

The flexible sheet with retroreflective elements is available from 3M Corporation. The trade name for this product is SCOTCHLITE and the flexible polymer is typically PVC. The product is available in a variety of sizes. The flexible reflectorized sheets may be delivered onto another material by way of utilizing transfer films. These transfer films are composed of retroreflector elements bonded to a variety of heat-activated adhesives. The retroreflector elements include wide angle, exposed retroreflective lenses bonded to a heat activated polyurethane adhesive. The reflective surface is protected by a white paper liner for ease in handling prior to lamination. A plastic liner protects the adhesive side and must be removed before lamination onto the nylon mesh strip. This flexible reflectorized sheet is thermally bonded to a nylon mesh strip, woven or knitted to form a flexible nylon retroreflective sheet.

The nylon mesh strip may have a width of 0.0165 cm to 0.635 cm (0.0065 inches to 0.25 inches) and is thermally bonded to a SCOTCHLITE strip having a width slightly less than the width of the nylon mesh strip. The SCOTCHLITE strip is bonded the entire length of the nylon mesh strip, and is bonded centrally on the nylon mesh strip, so that there are equal side portions of the nylon mesh strip on both sides of the SCOTCHLITE strip. The side portions are then sewn to a narrow width strip. The thermal bonding binder may be selected from a number of polymeric binders including, but not limited to, polyvinyl chloride, polyethylene, polyurethane, polyvinyl acetate or acrylates.

The SCOTCHLITE™ reflective material is composed of a wide angle, exposed retroreflective lenses bonded to a heat activated polyurethane adhesive. Alternately, the reflective material is composed of a wide angle, exposed retroreflective lenses bonded to bond to durable cloth backing comprised of 65% polyester, and 35% cotton, which is then treated with a polyurethane adhesive and thereby thermally bonded to a nylon mesh strip.

The SCOTCHLITE™ reflective material with the durable cloth backing is then thermally bonded onto a nylon mesh strip to form a flexible nylon retroreflective sheet. The flexible nylon retroreflective sheet is sewn onto a narrow width reflective strip by sewing using a lockstitch with no more than 12 stitches 2.54 cm (per 1 inch), and not less than 2 mm (5/64 inches) from the edge of the reflective fabric. The flexible nylon retroreflective sheet is highly flexible and can be cylindrically braided, for example, through the braiding of the narrow width strip to which it is attached via sewn to the surface thereof. At least three of these narrow width reflective strips are braided at a shallow cylindrical braid angle to form an omnidirectionally reflective sleeve having a braided construction surrounding a central rope core of the pet toy, which substantially sustains the pet toy handling and pulling forces.

The abrasion resistant omnidirectional pet toy is constructed by building a cylindrically reflective sleeve from the narrow width strips of nylon or polypropylene having the flexible nylon retroreflective sheets sewn thereto. The cylindrical braiding employs three or more narrow width strips. The cylindrical braiding is accomplished with a small angle between narrow width strips and the longitudinal direction of the central core rope. The proximal end of the central core of the pet toy is fashioned to form a loop representing a toy handle, and the distal end is formed to go through a rubber ball. The cylindrical braiding is accomplished to cover the entire length of the pet toy rope. The ends of the braid are terminated by permanent bonding.

Reflective material is bonded to a heat activated adhesive to form a transfer film. Alternatively, reflective material may be comprised of glass beads, partially embedded in fabric and coated with a polymer matrix, while still providing exposure of the glass beads to promote optics to form a fabric. The fabric is metalized with silver for abrasion and for industrial use. The reflective material may be impregnated with aluminum, which stands up well to home washing and works well with abrasion protection. The fabric may be laminated with a polyester film (mesh) in back for sewing purposes, and further treated with a heat activated adhesive for thermally bonding to a surface. For example, SCOTCHLITE™ reflective material utilizing silver fabric metalized with aluminum may be utilized. The reflective material by SCOTCHLITE™ sold as transfer film 8710—silver transfer film or, alternatively, 8910 silver fabric, may be utilized. An example of a transfer film and a fabric commercial reflective material by SCOTCHLITE™ is illustrated below:

TABLE A

| Product Name | Daytime Color | Reflected Color | Abrasion |
|---|---|---|---|
| 8710 Silver Transfer Film | Silver | White | EN 530 Method 2/ 5000 cycles |
| 8910 Silver Fabric | Silver | White | EN 530 Method 2/ 5000 cycles |

* SCOTCHLITE ™ is certified to meet ANSI/ISEA 1-7-1999 Level 2 retroreflective performance and EN 471 Class 2 retroreflective performance.

A transparent abrasion resistant coating is applied to the outer surface of the cylindrically reflective braided sleeve of the pet toy and is applied as a substantially conformal coating. The reflective strips have retroreflective elements embedded in the strips having a corner cube prismatic or microsphere geometry. These transparent retroreflective elements are made from high refractive index transparent materials such as barium oxide-titanium oxide containing glasses. They exhibit a refractive index in the range of 1.9 to 2.2. The transparent abrasion resistant polymeric coating is selected to have a refractive index, which is significantly less than that of the retrorefractive elements. As a result, the incident and reflected light path is not significantly altered even when the incident beam is inclined to the reflective strips. The internal reflection process within the retroreflective elements is not deteriorated by the transparent abrasion resistant coating. The polymers suitable for use with the transparent abrasion resistant coating have a refractive index in the range of 1.3 to 1.55.

In addition to this refractive index requirement, the transparent abrasion resistant coating must exhibit excellent mechanical properties, including tensile strength and elongation, in order to provide the required abrasion resistance. The polymer coating must also exhibit superior bond properties to the retroreflective elements and the underlying polymeric sheet of the reflective strip. If the bond properties are poor, the transparent abrasion resistant coating may delaminate when the pet toy is subjected to abrasion or flexing and twisting movement. The transparent abrasion resistant coating must have low elastic modulus so that it remains flexible when the pet toy is twisted or pulled by the pet. A high modulus transparent abrasion resistant coating is not desired since it applies significant stresses at the coating—reflective tape interface resulting in deterioration or fracture of the retroreflective elements.

A number of polymer systems meet these requirements. These polymers may be applied by dipping the cylindrically braided pet toy in a polymeric melt or by spraying a polymer composition dissolved in a suitable solvent. Thermosetting resin compositions such as two-component polyurethane may be painted or sprayed over the cylindrically braided reflective outer surface of the pet toy. In Table B below there are listed a number of transparent polymer compositions suitable for the pet toy abrasion resistant coating. Also listed are the refractive indexes for the compositions.

TABLE B

| Polymer Name | Refractive Index |
|---|---|
| aliphatic thermoplastic polyurethanes | 1.35 to 1.45 |
| Dow Corning OE-4100 Silicone elastomer | 1.4751 |
| Polymethyl tetradecyl siloxane | 1.4550 |
| Poly vinyl acetate | 1.4665 |
| PMMA Poly methyl methacrylate | 1.4893 |
| Cellulose acetate | 1.4750 |
| Ethylene/vinyl acetate copolymer EVA | 1.4820 |

Thermoplastic aliphatic thermoplastic polyurethanes are preferred as compared to aromatic urethanes because of their transparency, resistance to dirt build-up, flexiblility ultraviolet radiation degradation resistance. Typically, aliphatic polyurethane has the structure

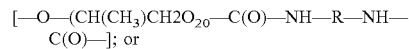

[—O—(CH(CH$_3$)CH2O$_{20}$—C(O)—NH—R—NH—C(O)—]; or

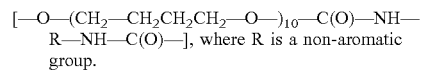

[—O—(CH$_2$—CH$_2$CH$_2$CH$_2$—O—)$_{10}$—C(O)—NH—R—NH—C(O)—], where R is a non-aromatic group.

Rohm and Haas, (Morton International Inc) supplies melt extrudable polyurethane compositions under the trade name designation MORTHANE L430.77 and MORTHANE Brand PN 3429-215. A melt extrusion process may be used to coat the external surface of the cylindrically braided reflective sleeve Aptec Laboratories, 28570, Livingston Avenue, Valencia Calif. 91355-4171. 661-257-1677 markets polyurethane with low elastic modulus for conformal coatings. Two component APTEK transparent unfilled polyurethane compositions of interest include the composition 2503-A/B (www.apteklabs.com/products/2503-AB.pdf) and the composition 2506-A/B (www.apteklabs.com/products/2506.pdf). These two compositions are designed for the encapsulation and protection of devices in applications that require toughness, excellent flexibility and optimum tensile strength, as well as elongation characteristics. APTEK 2503-A/B is curable at 80 C. while APTEK 2506-A/B is room temperature curable. Both compositions are dissolved in a solvent and are therefore suitable for brush or spray application.

Bayer provides a number of clear polyurethane coating compositions based on one component or two component systems. Desmodular I aliphatic diisocyanate is often abbreviated to IPDI, CAS 4098-71-9. Polyurethane prepared from IPDI is clear, tough and resists photodegradation and hydrolysis. Isocyanurate based on IPDI is marketed by Bayer under the trade name Z-4470; and is available in a number of solvent blends. Two component polyurethane is commonly formulated with Desmodur Z-4470. Desmodur E polyisocyanates is a single component moisture curable system capable of being diluted in a solvent.

www.setcochemicals.net/resins4.htm discloses a flexible room temperature curing polyurethane coating designated ROTOTHANE® 9020. This coating adheres to plastics and leather.

Dow Corning supplies a number of silicone compositions suitable for coating the cylindrically braided reflective strips to provide abrasion resistance. Conformal coatings are materials applied in thin layers (typically a few mils or a fraction of a mm) onto printed circuits or other electronic substrates. They provide environmental and mechanical protection to significantly extend the life of the components and circuitry. Conformal coatings are traditionally applied by dipping, spraying or simple flow coating, and increasingly by select coating or robotic dispensing. Key requirements for the clear coating are low viscosity, enabling application of thin conformal coatings, room temperature cure in reasonable cure time and reasonable hardness. In Table C below there are shown some of the conformal silicone coatings marketed by Dow Corning.

TABLE C

| Product Name | One part/Two part | Viscosity CPS | Cure | Durometer |
| --- | --- | --- | --- | --- |
| 3-1965 | 1 | 110 | RT 24 Hrs Moisture cure | 29 A |
| 3-1953 | 1 | 360 | RT 24 Hrs Moisture Cure | 26 A |
| 3-1765 | 1 | 150 | RT 24 Hrs Moisture cure | 25 A |
| 3-1753 | 1 | 385 | RT 24 Hrs Moisture cure | 25 A |
| Sylgard 1-4128 | 2 | 450 | 20 min/85 C | 64 OO |
| 1-4105 | 1 | 470 | 10 min/105 C | 65 OO |
| QI-4010 | 1 | 830 | 15 min/110 C | 30 A |
| I-2620 | 1 | 250 | RT 72 Hrs | 25 D Abrasion Resistant |
| I-2577 LOW VOC | 1 | 1250 | RT 72 Hrs | 25 D Abrasion Resistant |
| I-2577 | 1 | 725 | RT 72 Hrs | 23 D Abrasion Resistant |

Candidates for silicone conformal coating compositions that meet the low viscosity in the range of 100–250 CPS, room temperature cure in reasonable time period and reasonable hardness are coating compositions 3-1965, 3-1765 and 1-2620. These compositions may be dipped, brush painted or sprayed.

Of particular interest is a Dow Corning OE-4100 optical silicone elastomer, which cures in 2 hour at 150 C. with a platinum based catalyst, as discussed in www.dowcorning.com/content/photonic/75-1009B-01.pdf. This composition is specifically developed for use in the optical coating of optical components and is clear, transparent with a refractive index of 1.47.

Polyvinyl acetate is soluble in acetone as well as toluene. Acetone dissolved polyvinyl acetate film has a slightly higher elastic modulus as compared to that dissolved in toluene due to rapid evaporation of acetone. Acetone dissolved polyvinyl acetate is applied to the cylindrically braided surface of the pet toy to form a flexible film which is resistant to twisting action of a pet toy. Polyvinyl acetate is available from Union Carbide under the trade names AYAC, AYAA, AYAF and AYAT depending upon the molecular weight of the polymer.

FIG. 1 shows generally at 10 a photograph of the pet toy of the present invention. The pet toy 10 has a reflective cylindrical braided sleeve of narrow width strips covering a central core rope 11, a loop 12, a photoluminescence element 13 and a play ball 14 attached to the rope 11 and omnidirectionally reflective sleeve.

Figure 2:
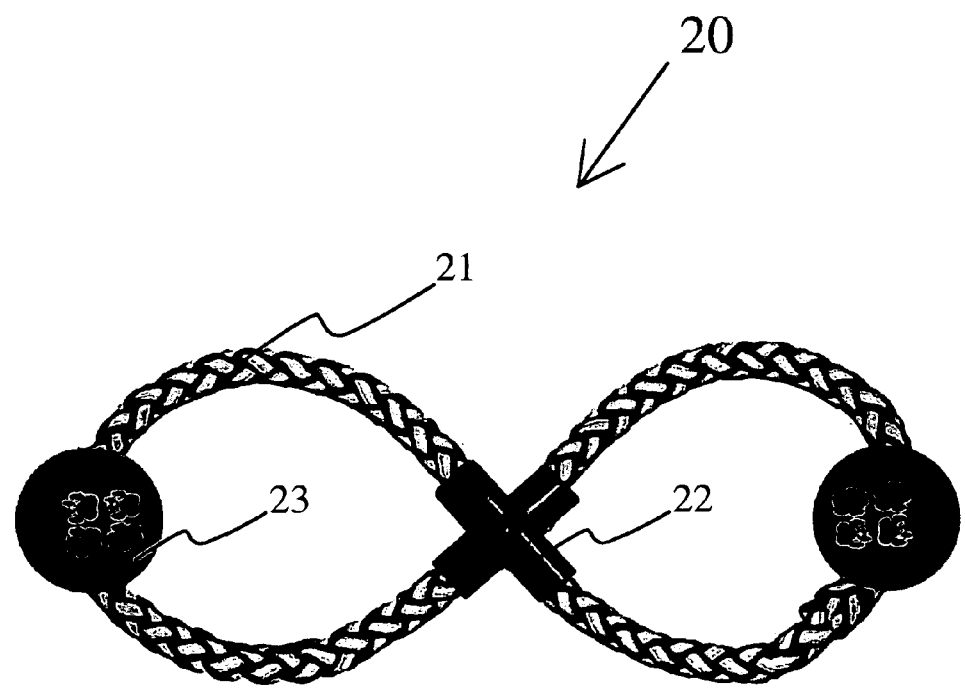
FIG. 2 is a photograph of the pet toy with the reflective cylindrical braided sleeve of narrow width strips covering a central core rope forming a pair of loops, each loop carrying a ball and a photoluminescence cross element between the loops of a pet toy.

FIG. 2 shows generally at 20 a photograph of the pet toy with the reflective cylindrical braided sleeve of narrow width strips covering a central core rope forming a pair of loops 21, each loop carrying a ball 23 and a photoluminescence cross element 22 between the loops of the pet toy.

Figure 3:
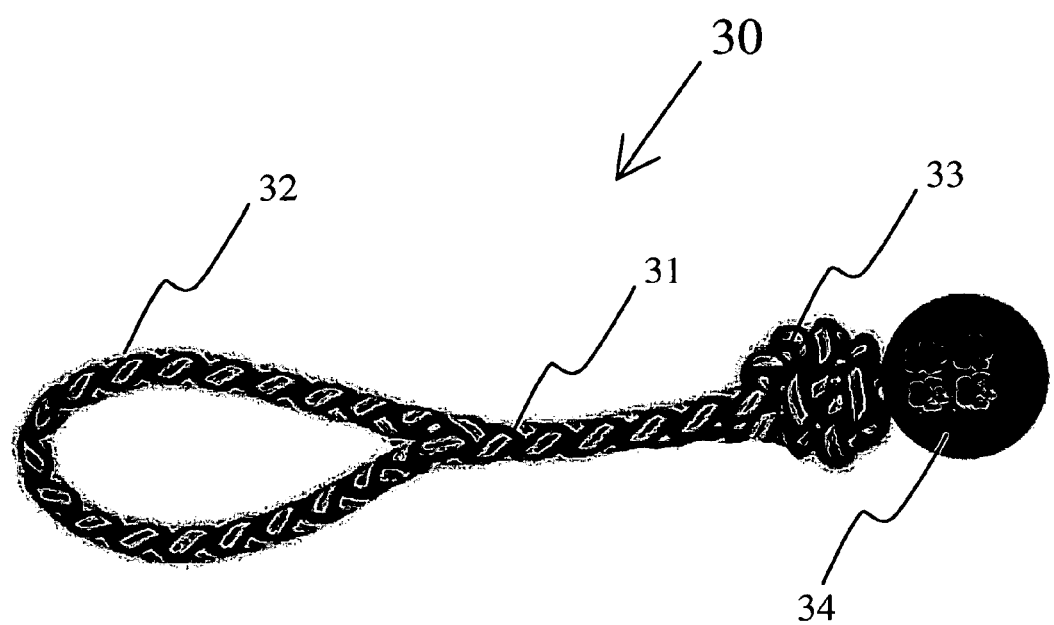
FIG. 3 is a photograph of the pet toy with the reflective cylindrical braided sleeve of narrow width strips covering a central core rope forming a pet toy that has a loop and a play ball attached to the rope with a knot having an omnidirectionally reflective sleeve.

FIG. 3 shows generally at 30 a photograph of the pet toy with the reflective cylindrical braided sleeve of narrow width strips covering a central core rope 31 forming a pet toy that has a loop 32 and a play ball 34 attached to the rope. The rope has a knot 33 with omnidirectionally reflective sleeve.

Figure 4:
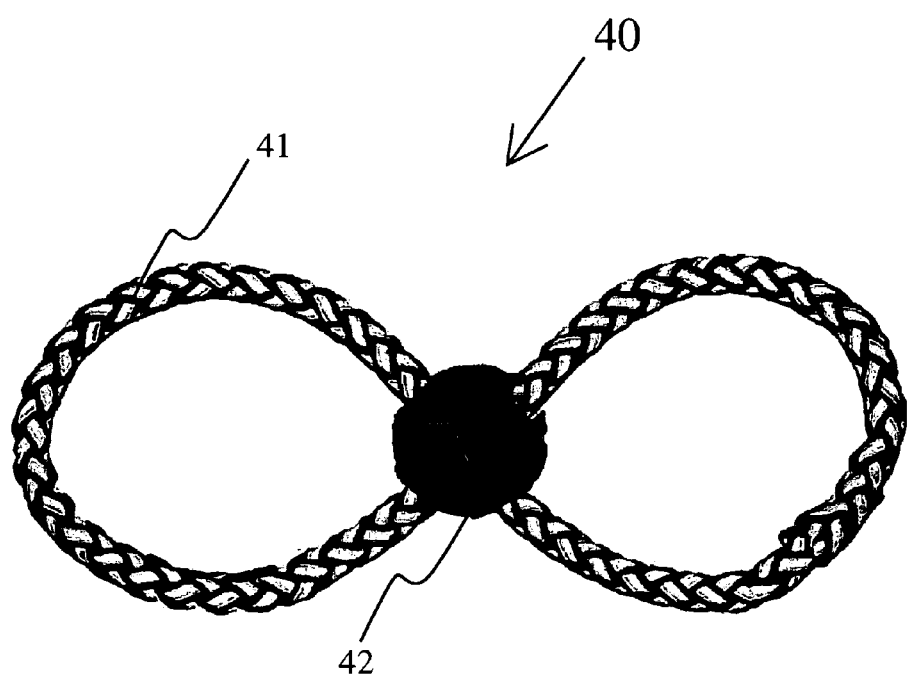
FIG. 4 is a photograph of the pet toy with the reflective cylindrical braided sleeve of narrow width strips covering a central core rope forming a pair of loops, a ball placed between the two loops forming a pet toy.

FIG. 4 shows at 40 a photograph of the pet toy with the reflective cylindrical braided sleeve of narrow width strips covering a central core rope forming a pair of loops 41. A ball 42 incorporated between the two loops forms a pet toy.

The key components of the abrasion resistant omnidirectionally reflective pet toy include, in combination, the features set forth below:

1. a pet toy comprised of a central cylindrical braided rope core composed of braided nylon or polypropylene fibers capable of sustaining tensile forces developed by pet toy pulling and handling loads;
2. the central cylindrical braided rope core being covered substantially with a transparent abrasion resistant conformal coating applied to a cylindrically reflective braided sleeve;
3. the cylindrically reflective braided sleeve formed by cylindrically braiding narrow width reflected strips, formed from knitted, woven or braided nylon, or polypropylene narrow width strips, having a flexible nylon retroreflective sheet, comprising a flexible retroreflective sheet thermally bonded onto a nylon mesh strip, sewn to the surface thereof;
4. each of the flexible retroreflector sheets being prepared by bonding corner cube geometry retroreflectors to a flexible polymeric sheet using a transparent binder;
5. such flexible retroreflector sheets alternately being prepared by bonding microsphere geometry retroreflectors to a metallized reflective flexible polymeric sheet using a transparent binder;
6. each of the flexible retroreflective sheets being thermally bonded to a nylon mesh strip to form a flexible nylon retroreflective sheet;
7. twist and flexure forces acting on the abrasion resistant omnidirectionally reflective pet toy being accommodated by the braided construction of the cylindrical reflective sleeve and the flexibility of the abrasion resistant coating;

8. the cylindrical braided sleeve-covered pet toy substantially reflecting incident light back in the same direction as the incident light, clearly indicating the whereabouts of the pet toy; and 9. the abrasion resistant omnidirectionally reflective pet toy providing an increased margin of safety operative to prevent tripping hazards for owners while walking in a dimly lit, pet play environment; and 10. the pet toy having photoluminescence elements incorporated together with an omnidirectional reflective element, and thereby glowing in the dark to provide an increased margin of safety and pet interest.

The abrasion resistant omnidirectionally reflective pet toy disclosed herein can be modified in numerous ways without departing from the scope of the invention. For example, different geometries of combinations of omnidirectional elements and photoluminescence elements together with the rubber ball and other objects may be used. These and other modifications are intended to fall within the scope of the invention, as defined by the subjoined claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A reflective pet toy, comprising:
   a. a central cylindrical braided rope core operable to sustain loads experienced by a pet toy;
   b. a cylindrical reflective braided sleeve comprising three or more narrow width reflective strips that are braided at a shallow cylindrical braid angle, said cylindrical reflective braided sleeve being operable to surround said central cylindrical braided rope core, thereby providing omnidirectional reflectivity;
   c. said cylindrical reflective braided sleeve substantially coated with a conformal transparent polymeric abrasion resistant coating;
   d. said narrow width reflective strips comprising a woven or knitted narrow width strip and a flexible nylon retroreflective sheet sewn thereon, said woven or knitted narrow width strip having a show surface, said flexible retroreflective nylon sheet comprising a flexible retroreflective sheet thermally bonded onto a nylon mesh strip, said nylon mesh strip being sewn onto said show surface of said narrow width reflective strip;
   e. said flexible retroreflective sheet having retroreflectors bonded thereto with a transparent bond layer;
   f. said transparent polymeric abrasion resistant coating having a refractive index lower than that of said retroreflectors; and
   g. said pet toy having a proximal end and a distal end, forming loops or knots or other geometrical shapes suited for insertion of objects attracting pet interest.

2. A reflective pet toy as recited by claim 1, wherein said central cylindrical braided rope core comprises braided nylon fibers.

3. A reflective pet toy as recited by claim 1, wherein said central cylindrical braided rope core comprises braided polypropylene fibers.

4. A reflective pet toy as recited by claim 1, wherein said cylindrical reflective braided sleeve is braided at a braid angle of 5 to 10 degrees.

5. A reflective pet toy as recited by claim 1, wherein each of said narrow width reflective strips has a width of 0.0065 to 0.25 inches.

6. A reflective pet toy as recited by claim 1, wherein said flexible retroreflective sheet is thermally bonded to said nylon mesh strip with polyvinyl chloride.

7. A reflective pet toy as recited by claim 1, wherein said flexible retroreflective sheet is thermally bonded to said nylon mesh strip with polyvinyl acetate.

8. A reflective pet toy as recited by claim 1, wherein said flexible retroreflective sheet is thermally bonded to said nylon mesh strip with polyurethane.

9. A reflective pet toy as recited by claim 1, wherein said flexible retroreflective sheet comprises a plurality of corner cube retroreflectors.

10. A reflective pet leash as recited by claim 1, wherein said flexible retroreflective sheet comprises a plurality of microsphere retroreflectors bonded to a light-reflecting sheet.

11. A reflective pet toy as recited by claim 1, wherein said flexible retroreflective sheet comprises a plurality of wide angle, exposed retroreflective lenses bonded to a heat activated polyurethane adhesive.

12. A reflective pet toy as recited by claim 1, wherein said flexible retroreflective sheet comprises a plurality of wide angle, exposed retroreflective lenses bonded to a durable cloth backing.

13. A reflective pet toy as recited by claim 1, wherein said retroreflectors have a refractive index in the range of 1.9 to 2.2.

14. A reflective pet toy as recited by claim 1, wherein said transparent polymeric abrasion resistant coating has a refractive index in the range of 1.3 to 1.55.

15. A reflective pet toy as recited by claim 1, wherein said transparent polymeric abrasion resistant coating has a thickness in the range of 0.002 to 0.010 inches.

16. A reflective pet toy as recited by claim 1, wherein said transparent polymeric abrasion resistant coating polymer is a member selected from the group consisting of polyurethane, silicone, polymethyl methacralate, and polyvinyl acetate.

17. A reflective pet toy as recited by claim 16, wherein said polyurethane is aliphatic polyurethane.

18. A reflective pet toy as recited by claim 16, wherein said polyurethane is melt extruded.

19. A reflective pet toy as recited by claim 16, wherein said polyurethane is dissolved in a solvent and sprayed on the said cylindrical reflective braided sleeve.

20. A reflective pet toy as recited by claim 16, wherein said silicone comprises a silicone composition having a viscosity in the range of 100–275 CPS.

21. A reflective pet toy as recited by claim 1, wherein said geometrical shapes include one or more rubber play balls.

22. A reflective pet toy as recited by claim 1, wherein said geometrical shapes include at least one photoluminescence glow-in-the-dark element.

23. A reflective pet toy as recited by claim 22, wherein said photoluminescence glow-in-the-dark element comprises a decorative element.

24. A process for manufacture of a reflective pet toy, comprising the steps of:
   a. selecting a braided nylon or polypropylene cylindrical central rope, said cylindrical central rope having a proximal end, a distal end, and an external surface;
   b. selecting a flexible polymer sheet;

c. coating said flexible polymer sheet with a plurality of retroreflectors using a transparent binder to form a retroreflector coated flexible polymer sheet;
d. thermally bonding said retroreflector coated flexible polymer sheet to a nylon mesh strip to form a flexible nylon retroreflective sheet;
e. sewing said flexible nylon retroreflective sheet to a narrow width reflective strip;
f. braiding at least three of said narrow width reflective strips at a shallow cylindrical braid angle surrounding said cylindrical central rope to form an omnidirectionally reflective sleeve having a braided construction;
g. stitching or bonding said braided sleeve to said cylindrical central rope;
h. inserting geometrical shapes selected from one or more play balls and one or more photoluminescence molded polymeric shapes;
i. forming knots or one or more closed loops;
j. applying a transparent flexible polymeric abrasion resistant conformal coating to substantially cover said omnidirectionally reflective sleeve,
said omnidirectionally reflective pet toy being operable to sustain abrasion and substantial toy-play forces, and to accommodate twist and flexure forces due to strength and movement afforded by said braided construction of said omnidirectionally reflective sleeve.

* * * * *